United States Patent
Garoffolo et al.

(10) Patent No.: US 11,853,316 B1
(45) Date of Patent: Dec. 26, 2023

(54) SYSTEM AND METHOD FOR THE CREATION AND MANAGEMENT OF PRIVACY-PRESERVING AUDITS

(71) Applicant: Horizen Labs, Inc., Austin, TX (US)

(72) Inventors: Alberto Garoffolo, Milan (IT); Ulrich Haboeck, Milan (IT); Maurizio Binello, Milan (IT)

(73) Assignee: Horizen Labs, Inc., Austin, TX (US)

( * ) Notice: Subject to any disclaimer, the term of this patent is extended or adjusted under 35 U.S.C. 154(b) by 0 days.

(21) Appl. No.: 17/865,777

(22) Filed: Jul. 15, 2022

Related U.S. Application Data

(60) Provisional application No. 63/350,589, filed on Jun. 9, 2022.

(51) Int. Cl.
  *G06F 16/25* (2019.01)
  *G06F 16/23* (2019.01)
  *H04L 9/00* (2022.01)
  *H04L 9/32* (2006.01)

(52) U.S. Cl.
  CPC ........ *G06F 16/258* (2019.01); *G06F 16/2365* (2019.01); *G06F 16/2379* (2019.01); *H04L 9/3218* (2013.01); *H04L 9/50* (2022.05)

(58) Field of Classification Search
  CPC ............... G06F 16/258; G06F 16/2379; G06F 16/2365; H04L 9/50; H04L 9/3218
  See application file for complete search history.

(56) References Cited

U.S. PATENT DOCUMENTS

| | | | |
|---|---|---|---|
| 11,501,370 B1 * | 11/2022 | Paya | G06Q 20/3676 |
| 2020/0034469 A1 * | 1/2020 | Sato | G06F 16/1834 |
| 2020/0145192 A1 * | 5/2020 | Elkhiyaoui | H04L 9/0869 |
| 2020/0174990 A1 * | 6/2020 | Pratkanis | H04L 9/0637 |
| 2020/0294143 A1 * | 9/2020 | Qiu | H04L 9/50 |
| 2021/0365585 A1 * | 11/2021 | Ratliff | H04L 9/0643 |
| 2022/0385499 A1 * | 12/2022 | Doney | G06F 16/2379 |

FOREIGN PATENT DOCUMENTS

| | | | | | |
|---|---|---|---|---|---|
| CN | 113296733 A | * | 8/2021 | | G06F 7/52 |
| KR | 20220108358 A | * | 1/2021 | | |
| WO | WO-2022109851 A1 | * | 6/2022 | | |

OTHER PUBLICATIONS

Michael Sipser, Introduction to the Theory of Computation (3rd Edition), Cengage Learning 2012; https://www.cengage.co.uk/books/9780357670583/.

Paul Valiant. Incrementally Verifiable Computation or Proofs of Knowledge Imply Time/Space Efficiency, TCC 2008, LNCS 4948, Springer; https://link.springer.com/book/10.1007/978-3-540-78524-8?noAccess=true.

(Continued)

*Primary Examiner* — Darshan I Dhruv
(74) *Attorney, Agent, or Firm* — White and Williams LLP

(57) ABSTRACT

The system and method of the present disclosure includes creation and management of audit chains, which are distributed ledgers serving a native translation of non-native statements. The system and method further includes the application of audit chains to zk-audits, in which the provider of a service, e.g., a centralized token exchange, proves correct behavior to its clients without revealing private data.

5 Claims, 6 Drawing Sheets

(56) References Cited

OTHER PUBLICATIONS

Nir Bitansky, Ran Canetti, Alessandro Chiesa and Eran Tromer, Recursive Composition and Bootstrapping for SNARKs and Proof-Carrying Data. STOC 13, ACM 2013; https:/eprint.iacr.org/2012/095.pdf.

Jens Groth, On the Size of Pairing-based Non-interactive Arguments. EUROCRYPT 2016, LNCS 9666, Springer; https://doi.org/10.1007/978-3-662-49896-5_11.

Jens Groth and Mary Maller, Snarky Signatures: Minimal Signatures of Knowledge from Simulation-Extractable SNARKs. CRYPTO 2017, LNCS 10402, Springer; https://doi.org/10.1007/978-3-319-63715-0_20.

Eli Ben-Sasson, Iddo Bentov, Yinon Horesh and Michael Riabzev, Scalable, transparent, and post-quantum secure computational integrity; IACR ePrint Archive 2018/046.

Eli Ben-Sasson, Alessandro Chiesa, Michael Riabzev, Nicholas Spooner, Madars Virza and Nicholas Ward, Aurora: Transparent Succinct Arguments for R1CS. EUROCRYPT 2019, LNCS 11576, Springer; https://eprint.iacr.org/2018/828.pdf.

Sean Bowe and Jack Grigg and Daira Hopwood, Recursive Proof Composition without a Trusted Setup; IACR ePrint Archive 2019/1021; https://eprint.iacr.org/2019/1021.

Ariel Gabizon and Zachary J. Williamson and Oana Ciobotaru, PLONK: Permutations over Lagrange-bases for Oecumenical Non-interactive Arguments of Knowledge; IACR ePrint Archive 2019/953; https://eprint.iacr.org/2019/953.

Sean Bowe, Allesandro Chiesa, Matthew Green, Ian Miers, Pratyush Mishra, and Howard Wu. ZEXE: Enabling Decentralized Private Computation. 2020 IEEE Symposium on Security and Privacy; https://ieeexplore.ieee.org/document/9152634/metrics#metrics.

Ariel Gabizon and Zachary J. Williamson, PLOOKUP: A simplified polynomial protocol for lookup tables; IACR ePrint Archive 2020/315; https://eprint.iacr.org/2020/315.

Mary Maller, Sean Bowe, Markulf Kohlweiss and Sarah Meiklejohn, Sonic: Zero-Knowledge SNARKs from Linear-Size Universal and Updatable Structured Reference Strings, ACM SIGSAC 2019; https://eprint.iacr.org/2019/099.pdf.

Benedikt Bünz, Alessandro Chiesa, Pratyush Mishra, and Nicholas Spooner, Proof-Carrying Data from Accumulation Schemes, 2020, LNCS 12551, Springer; https://eprint.iacr.org/2020/499.

Alessandro Chiesa, Yuncong Hu, Mary Maller, Pratyush Mishra, Noah Vesely and Nicholas Ward, Marlin: Preprocessing zkSNARKs with Universal and Updatable SRS, EUROCRYPT 2020, LNCS 12105, Springer; https://eprint.iacr.org/2019/1047.pdf.

Dan Boneh, Justin Drake, Ben Fisch and Ariel Gabizon, Proof-Carrying Data from Additive Polynomial Commitments. CRYPTO 2021, LNCS 12825, Springer; https://eprint.iacr.org/2020/1536.pdf.

Benedikt Bünz, Alessandro Chiesa, William Lin, Pratyush Mishra, Nicholas Spooner, Proof-Carrying Data Without Succinct Arguments. CRYPTO 2021, LNCS 12825, Springer; https://doi.org/10.1007/978-3-030-84242-0_24.

Alberto Garoffolo, Dmytro Kaidalov, and Roman Oliynykov. Zendoo: a zk-SNARK Verifiable Cross-Chain Transfer Protocol Enabling Decoupled and Decentralized Sidechains; IACR ePrint Archive 2020/123; https://eprint.iacr.org/2020/123.

Alberto Garoffolo and Dmytro Kaidalov and Roman Oliynykov, Latus incentive scheme: Enabling Decentralization in Blockchains based on Recursive SNARKs; IACR ePrint Archive 2021/399; https://eprint.iacr.org/2021/399.

Ulrich Haböck, Alberto Garoffolo, and Daniele Di Benedetto, Darlin: Recursive Proofs using Marlin; IACR ePrint Archive 2021/930; https://eprint.iacr.org/2021/930.

* cited by examiner

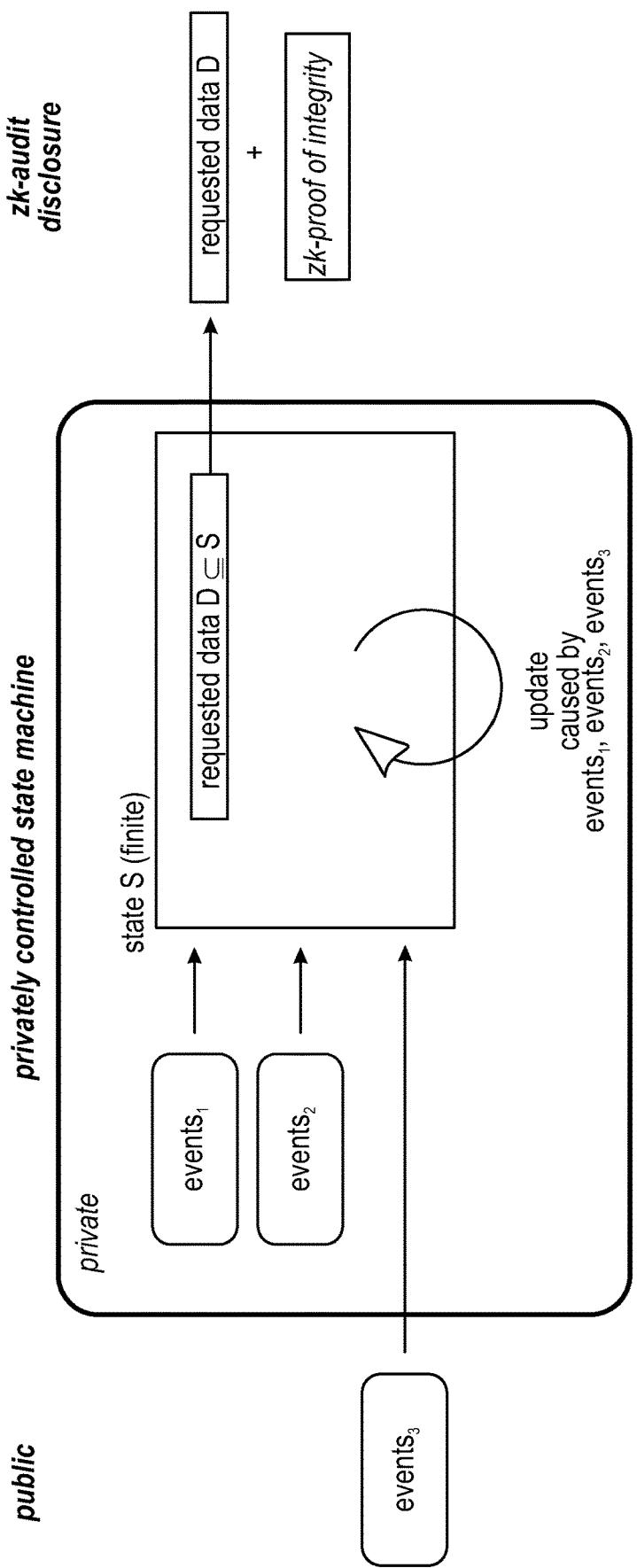
FIGURE 6 - RELATED ART

SYSTEM AND METHOD FOR THE CREATION AND MANAGEMENT OF PRIVACY-PRESERVING AUDITS

CROSS-REFERENCE TO RELATED APPLICATIONS

This application claims the benefit of U.S. Provisional Patent Application Ser. No. 63/350,589, filed on Jun. 9, 2022, the contents of which are hereby incorporated by reference in their entirety.

BACKGROUND

A finite state machine is a well-defined, discrete-time process on a well-defined finite set of variables, called the state space, the state transitions of which may be triggered by events. Formally, the mechanics of the state machine, i.e., the rules for state transition triggered by an event, are described by a finite set of rules depending on the current state and the event. The present disclosure restricts to finite state machines as a specific computational model for simplicity and is intended without loss of generality. Practically all computational processes are resource constrained and henceforth finite state machines.

A state machine is "privately controlled" or "private" when the state in its entirety is known only to a single entity, referred to as the "operator" or "owner". In contrast to the state of a privately controlled state machine, the mechanics of the state machine are publicly declared. The rules of the mechanics might refer to both public and private events. In other words, the state machine represents the committed "process logic", whereas the state is the private data the logic operates on. While keeping the state private, a privately controlled state machine may allow third parties, typically "clients", access to a dedicated part of it in a privacy preserving manner, without such clients learning the private data of others. For example, the dedicated part for a client might involve the client's private data, e.g., in an account-based business logic, and/or certain additional variables of the state and in a role-based logic.

A "zero-knowledge audit" ("zk-audit") for a privately controlled state machine is a mechanism for privacy-preserving state access, together with a zero-knowledge proof of integrity for the queried data. That proof of integrity certifies the data is part of the current state which is correctly derived from a public or publicly trusted initial state, following the publicly declared rules of the state machine, while not revealing any information beyond the queried data. Both privacy-preserving access and zero-knowledge audit can be formalized by cryptographic security notions.

FIG. 6 shows input and output from a privately controlled state machine according to related art. $Event_1$ and $event_2$ are private events within the privately controlled state machine. $Event_2$ is a public event occurring external to the privately controlled state machine, such as the addition of a new block to a blockchain. $Event_1$, $event_2$, and $event_3$ may be input into a finite state machine, thereby causing an update of its state. The operator of the privately controlled state machine may output a zero-knowledge audit disclosure including requested data D as a subset of the state S, along with a zero-knowledge proof of integrity.

Succinct non-interactive arguments of knowledge (SNARKs) are signatures of computation that certify the correctness of a given computation. SNARKs that prevent the internal data used in those computations from being disclosed are known as zero-knowledge SNARKs. Zk-SNARKs are one of the cryptographic key tools in building secure protocols for decentralized systems. In interoperability protocols (e.g., zero-knowledge rollups, Web3) and privacy-preserving applications, proving a party's compliance with protocol specifications is an essential requirement.

Transparent setup SNARKs are zero-knowledge SNARKs that do not rely on a trusted setup (typically a multi-party setup ceremony). A transparent setup is essential for gaining trust in decentralized protocols, and the non-limiting example described herein may make use of a scalable transparent setup SNARK, often referred to as STARKs, based on proof-carrying data from aggregation schemes.

In principle, any type of computation can be proven by a zero-knowledge SNARK or STARK. However, the practical performance depends on how compact the computation can be translated into a certain type of algebraic description specific to the zero-knowledge SNARK system. This step is referred to as arithmetization. Most state-of-the-art SNARKs choose arithmetic circuits for describing computations. For known systems, only very specific "native" computations allow a reasonably compact arithmetization. SNARK proofs may be subject to "non-native" statements, i.e., statements not well-suited to the specific instantiation of the proof system. Non-native computations are costly to arithmetize, causing high computational costs for the prover.

When proving a finite state machine, efficient arithmetization is a significant obstacle in applications that rely on external events. For this reason, it is desirable to create translation chains that serve a certified arithmetization-friendly conversion of external events. State machines referring to translation chains, as described in the invention of the present disclosure, are significantly easier to prove compared to the direct approach of proving "non-native" statements, yielding a prover speed up by a factor of several hundreds, e.g., two hundred times faster.

SUMMARY OF THE INVENTION

A method including identifying an external event by a distributed Byzantine fault-tolerant translation ledger operated by a plurality of translation nodes, and processing, according to rules of the distributed Byzantine fault-tolerant translation ledger, information within the external event, the processing including converting at least a portion of information in the external event into a format that is more efficiently processed by a cryptographic proof system proving a state machine.

BRIEF DESCRIPTION OF THE DRAWINGS

Features of the present disclosure are illustrated by way of example and not limited in the following figures, in which like numerals indicate like elements and in which:

FIG. 6 shows a zero-knowledge audit of a privately controlled state machine according to related art.

DETAILED DESCRIPTION

This document describes the underlying general construction of zk-audits on the basis of translation chains.

Throughout the present disclosure, the system and method will be demonstrated by means of a specific use case, a centralized exchange. It will be apparent that the disclosure may be practiced without limitation to these specific details. In other instances, methods and structures readily understood by one of ordinary skills in the art have not been described in detail so as not to unnecessarily obscure the present disclosure. As used herein, the terms "a" and "an" are intended to denote at least one of a particular element, the term "includes" means includes but is not limited to, the term "including" means including but not limited to, and the term "based on" means based at least in part on.

A centralized exchange provides its clients with the ability to trade different types of token (such as Bitcoin, Ethereum, etc.) at a marketplace. Trading is done in real-time, but the private key material for all traded assets may typically be under control of the exchange. A centralized exchange may be a privately controlled state machine. Clients may have access to certain dedicated parts of the state, e.g. their account and the marketplace, but the exchange may control the state machine, and the client may trust it is operated according to public policy. In particular, the client balances provided by the exchange may be considered claims without proof they are backed by "real" crypto assets of the exchange. For this reason, the system and method of the present disclosure may be applied to a centralized exchange for providing a proof of liquidity as an illustrative example.

The translation chain is a Byzantine fault-tolerant ledger, i.e., blockchain, that may provide a decentralized certified translation of external events into a circuit-friendly variant, hence allowing for a more efficient arithmetization of the business state machine.

An external event may be a new block of a blockchain or any other token traded by the exchange. This block may be referred to as a native block, and the blockchain may be referred to as a native blockchain. Once a native block is sufficiently confirmed by the native consensus and considered stable, it may undergo a translation process performed by the nodes of the translation chain, referred to as translation chain nodes. The translation rules may depend on the specifications of the external event and the choice of the SNARK system for providing zk-audit proofs. The translation process itself is deterministic, and its correctness may be enforced by the consensus mechanism of the translation chain. Any sufficiently often confirmed translation block may now be taken as a reference for zero-knowledge audits, with the advantage of substantially increased proving efficiency of several hundred times.

Figure 1:
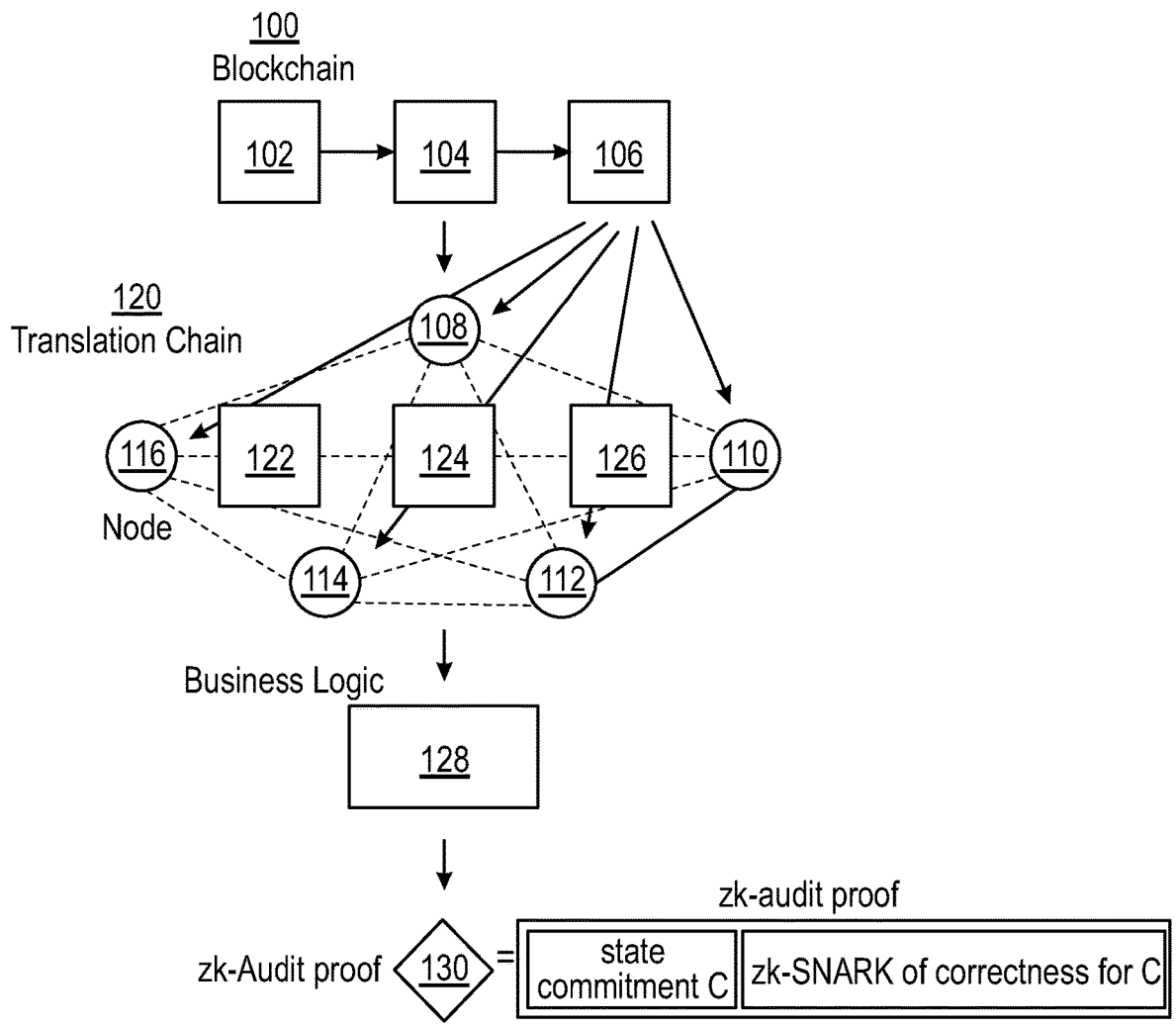
FIG. 1 shows a system for generating zero-knowledge audit proofs according to an aspect of the invention of the present disclosure.

FIG. 1 shows blockchain 100 with pre-existing blocks 102, 104, and new block 106. Blocks contain information including transaction data and a hash may be stored on one or more networked computing platforms. Translation chain nodes 108, 110, 112, 114, 116 may be software processes executed on networked computing platforms and may access blockchain 100. Translation chain 120 may include pre-existing blocks 122, 124, and new translation chain block 126. Business logic 128 may be a finite state machine software process executed on one or more networked computing platforms. Business logic 128 updates its internal state according to the changes caused by the new translation block (and other private events). In addition, a zero-knowledge audit proof 130 is generated, which cryptographically certifies the current state expressed by the commitment C is correct.

Figure 2:
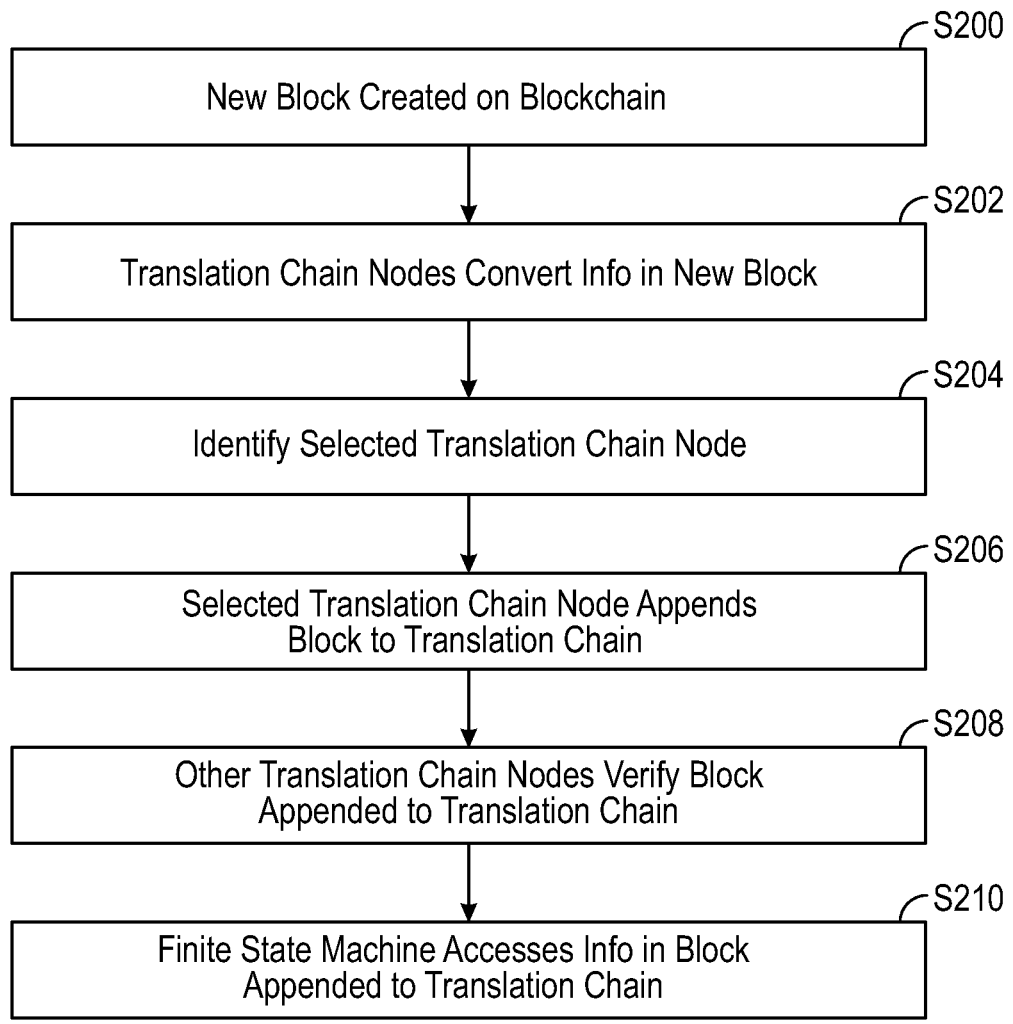
FIG. 2 shows a flowchart for generating zero-knowledge audit proofs according to an aspect of the invention of the present disclosure.

In FIG. 2, Step S200, new block 106 is created on blockchain 100. Translation chain nodes 108-116 may monitor blockchain 100 for the addition of new block 106. In Step S202, translation chain nodes 108-116 may receive and process new block 106. Translation chain nodes 108-116 may convert the relevant information in the new block 106 into a SNARK-friendly representation. In Step S204, a consensus protocol operating on translation chain nodes 108-116 determines and identifies a selected translation chain node from translation chain nodes 108-116. In Step S206, the selected translation chain node appends its SNARK-friendly representation into new translation chain block 126 on translation chain 120. In Step S208, the translation chain nodes other than the selected translation chain node verify the SNARK-friendly representation created by the selected translation chain node. In Step S210, business logic 128 may access the SNARK-friendly representation in new translation chain block 126. Business logic 128 may be a zero-knowledge exchange that can provide a zero-knowledge audit proof 130, which may be a zero knowledge proof of certain characteristics, such as liquidity or regulatory compliance, based on information in blockchain 100.

Figure 3:
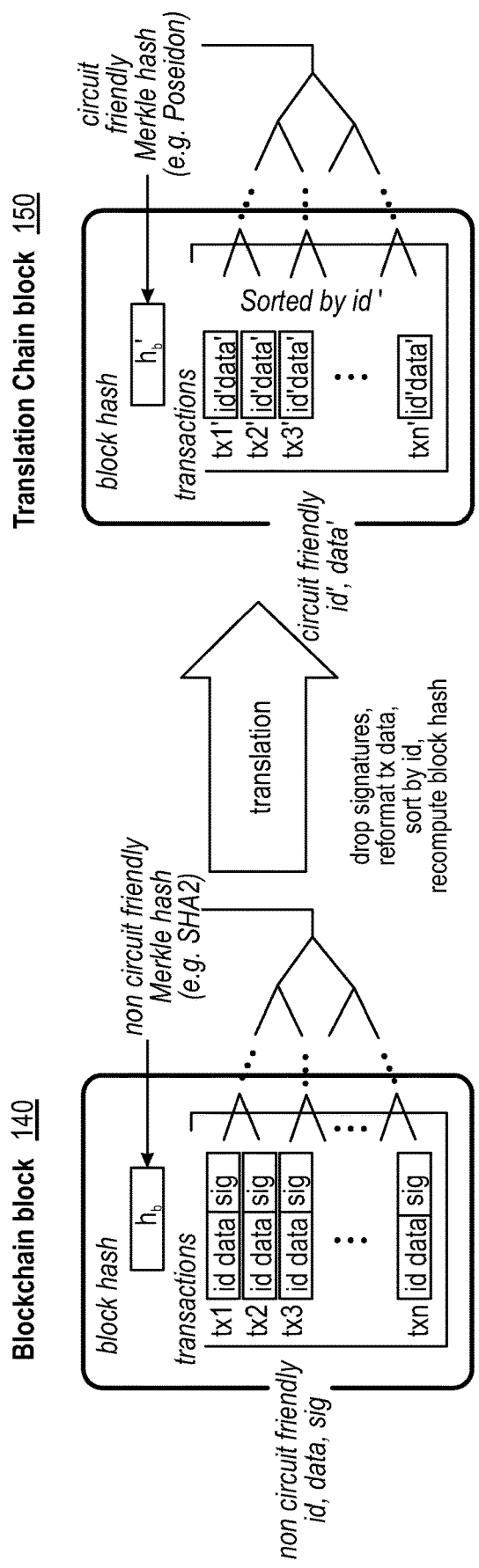
FIG. 3 shows block transformation according to an aspect of the invention of the present disclosure.

During Step S204, translation chain nodes 108-116 may translate blockchain block 140 into translation chain block 150. As aforementioned, the concrete form of a circuit-friendly translation may depend on the concrete choice of the SNARK and the specification of the native blockchain. Typically, data representations are reformatted, and cryptographic algorithms used by the native blockchain are replaced by arithmetization-friendly variants. FIG. 3 illustrates a possible translation of a (simplified) Bitcoin block into a translation chain block.

FIG. 3 shows a blockchain block 140, for example, a Bitcoin block, and translation chain block 150 output from a translation chain node (not shown). Blockchain block 140 may contain block hash $h_b$, and one or more transactions $tx_1$ to $tx_n$. Transactions $tx_1$ to $tx_n$ may contain data, such as identification data (id data) and signatures (sig). Information in blockchain block 140 may be present in a format that is non-circuit friendly, and the blockhash $h_b$ may be computed by a hash function that is non-circuit friendly. During processing by translation chain node 108-116, signatures may be dropped, data, such as identification data, may be sorted and reformatted (into id' data'), and the non-circuit Merkle hash $h_b$, e.g. SHA256, may be replaced by a circuit friendly hash $h_b'$, e.g., Poseidon.

When a party e.g., owner or a client, wants to refer to a dedicated part of the current state, the owner reveals that part together with a disclosure proof. Both proofs together, the zk-audit proof plus the disclosure proof, cryptographically certify the correctness of the revealed part.

Zk-audit proofs may be updated in the course of transitioning the state of the machine to be proven. Such updates may be computed recursively in the style of incremental verifiable computation, or more generally proof-carrying data schemes. Each proof certifies the proof for the previous state together with the correctness of the state transition subject to the inputs provided in the current block of the translation chain. The integrity proof can be published in the translation chain itself, or can be handled offline, e.g., on the business owner's website.

In a simplified business model of the exchange served by the system and method of the present disclosure, one type of role considered are clients, who may buy and sell crypto assets and desire assured integrity. The state of the business logic may include (i) client accounts that record current balances and history, and (ii) the owner account, which keeps track of the addresses owned by the exchange and their balances. A more elaborate model may further include lender accounts.

Practically, the state may be arranged as needed for efficient state transition proofs for allowing efficient membership proofs when using hash-based commitments. Furthermore, the state may be augmented by certain cumulative values, such as (i) the overall amount for all exchange owned addresses; (ii) the overall amount of all values as claimed in the client accounts; and (iii) a boolean value for the overall balance of the two. The exchange may commit to the state via a circuit-friendly hash function and publish state commitments, optionally with some auxiliary information, in the translation chain or "offline", e.g., on their website.

Figure 4:
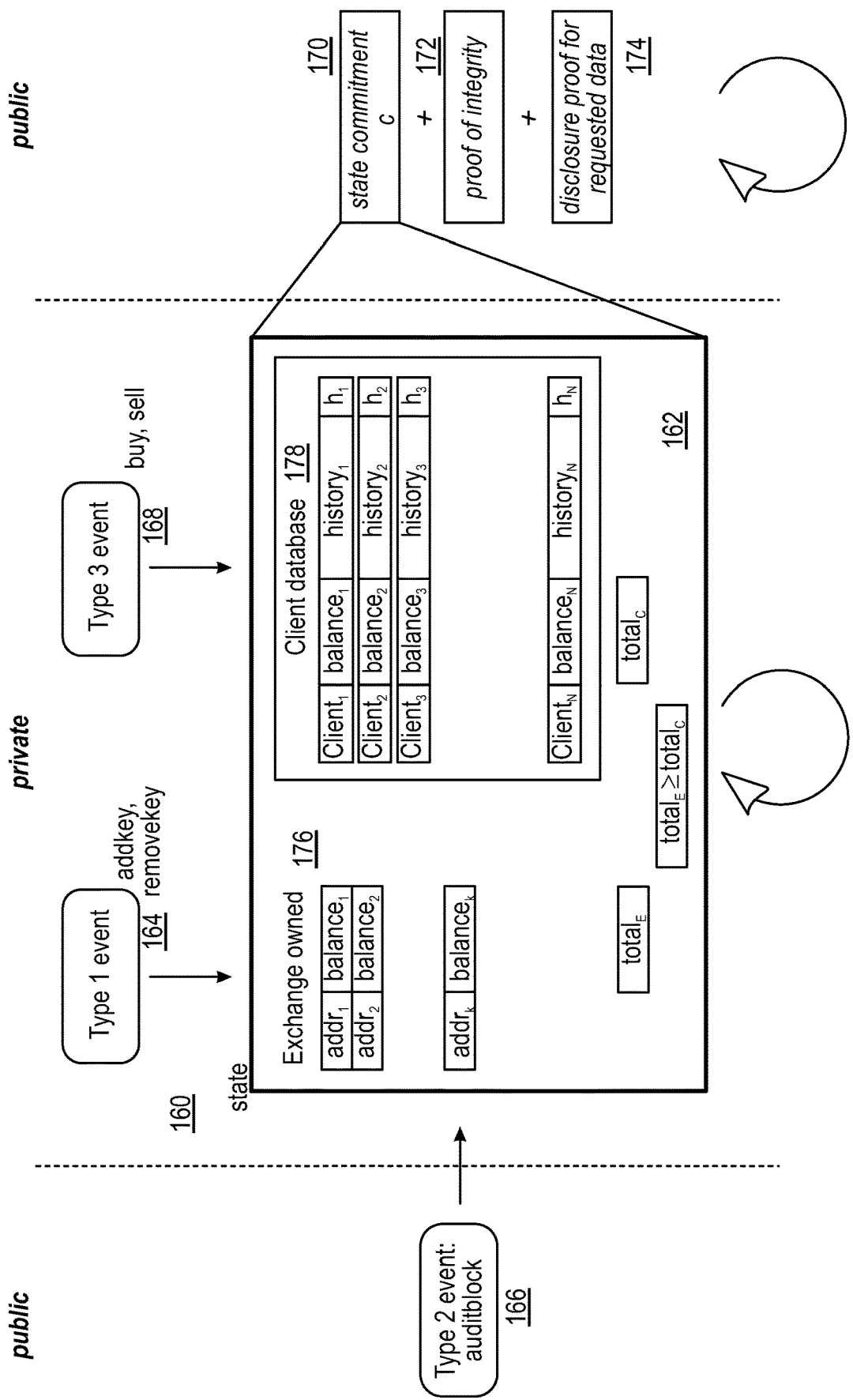
FIG. 4 shows a state machine with inputs and outputs according to an aspect of the invention of the present disclosure.
Figure 5:
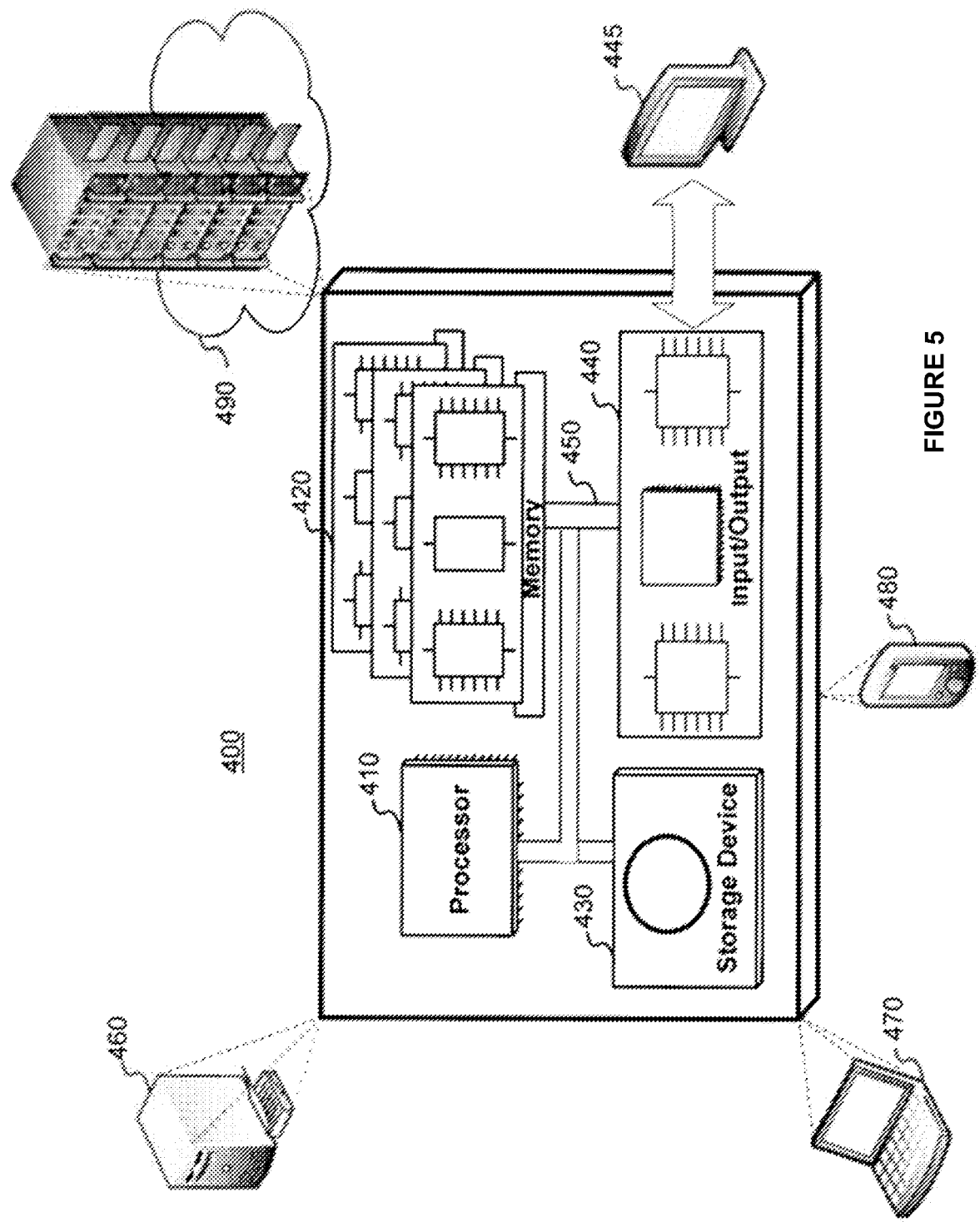
FIG. 5 shows a schematic diagram depicting a representative computer system according to aspects of the present disclosure.

FIG. 4 shows state machine 160 that depicts its entire state 162, triggering events Type 1 164, Type 2 166, Type 3 168, and outputs 170, 172, 174.

As described with reference to FIG. 4, state transition may triggered by one or more of the following three types of events:

Type 1 Event 164—Key management actions: When the exchange adds a native blockchain address to its key ring, it may provide an ownership proof for that key. Key management actions may include addkey to keyring; remove key from keyring.

Type 2 Event 166—Transactions in a translation chain block: These events may be related to the translation chain block, which is a public event. If and only if a transaction listed in a translation chain block concerns an exchange address either as input or output, both the owner account and the exchange overall amount are updated accordingly.

Type 3 Event 168—Transactions related to client accounts: These events may be related to client triggered actions, such as buy/sell requests, causing the balance of clients to change accordingly.

State 162 may include owner account database 176 and client account database 178. Owner account database 176 may include $addr_1$, which may be a currency address owned by the owner or exchange, and $balance_1$ is a corresponding currency value belonging to that address. $Total_E$ is a sum of the $balances_{1-k}$.

Client account database 178 may include clients identifying a client; $balance_1$ a total value of currency assets for that client; $history_1$ which is an account history or list of client actions; and hi which is a hash of $history_1$. $Total_C$ is a sum of $balances_{1-N}$.

Boolean value ($total_E >= total_C$) is false if the total assets for owner account database 176 are less than the total assets listed in client account database 178. This indicates the liquidity status of the exchange. This boolean value is disclosed along the zk-audit proof.

State of commitment C 170 is a cryptographic commitment to the state 162 of the finite state machine 160. This may be a binding and hiding commitment.

Proof of integrity 172 certifies in zero-knowledge the state corresponding to C is correctly derived from a public or publicly trusted initial state, following the publicly declared rules of the state machine 160.

Disclosure proof of requested data 174, in this case the boolean value ($total_E >= total_C$), proves it is a part of the state committed by C, while not revealing information beyond the queried data.

The translation chain 120 may provide the pulse for triggering state transitions. When a translation block 126 achieves sufficiently many confirmations (by consensus of the translation chain nodes 108-116), the exchange updates the state 162 according to the above described mechanics. Such an update is with respect to the transactions in the translation chain block 126 (Type 2 Event), and additionally by changes of Type 1 Event and Type 3 Event, if present.

As described above, only Type 2 events are publicly recorded. Type 1 events are verified in zero-knowledge by the proof of state, which integrates an ownership proof of every exchange address involved in the state transition. There is no need for logging these events publicly because it may not be desirable to disclose the addresses owned by the exchange. Type 3 events result from private communication of the client with the exchange. There are several ways to certify such types of transactions. In a most elementary model, one may assume that each client checks the validity of its account history on a regular basis by verifying disclosure proofs requested for h.

To show liquidity, the exchange may disclose the witness reflecting a positive overall balance, together with an aforementioned disclosure proof referring to the current state As aforementioned, the model of the non-limiting example described herein is meant to illustrate liquidity proofs. In addition the exchange may prove integrity of its market maker, i.e. the algorithm that matches offering and demanding parties. Furthermore, it may provide compliance reports for its clients, proving the correctly aggregated amount of taxes in zero-knowledge, i.e., without disclosing the activities in detail. Both features may be realized by extending the business mechanics correspondingly.

FIG. 6 shows an illustrative computer system 400 suitable for implementing methods and systems according to an aspect of the present disclosure. The computer system may comprise, for example, a computer running any of a number of operating systems. The above-described methods of the present disclosure may be implemented on the computer system 400 as stored program control instructions.

Computer system 400 includes processor 410, memory 420, storage device 430, and input/output structure 440. One or more input/output devices may include a display 445. One or more busses 450 typically interconnect the components, 410, 420, 430, and 440. Processor 410 may be single or multi core.

Processor 410 executes instructions in which aspects of the present disclosure may comprise steps described in one or more of the Figures. Such instructions may be stored in memory 420 or storage device 430. Data and/or information may be received and output using one or more input/output devices.

Memory 420 may store data and may be a computer-readable medium, such as volatile or non-volatile memory, or any non-transitory storage medium. Storage device 430 may provide storage for system 400 including for example, the previously described methods. In various aspects, storage device 430 may be a flash memory device, a disk drive, an optical disk device, or a tape device employing magnetic, optical, or other recording technologies.

Input/output structures 440 may provide input/output operations for system 400. Input/output devices utilizing these structures may include, for example, keyboards, displays 445, pointing devices, and microphones—among others. As shown and may be readily appreciated by those skilled in the art, computer system 408 for use with the present disclosure may be implemented in a desktop computer package 460, a laptop computer 470, a hand-held computer, for example a tablet computer, personal digital assistant, mobile device, or smartphone 480, or one or more server computers that may advantageously comprise a "cloud" computer 490.

The invention claimed is:

1. A computer-implemented translation ledger management method applied to a source ledger, the method comprising:

tracking events in the source ledger by a translation ledger operated by a plurality of translation nodes, wherein the translation ledger is a distributed Byzantine fault-tolerant ledger;

processing, according to rules of the translation ledger, information within a source event in the source ledger to be appended to the translation ledger, the processing comprising converting at least a portion of information in the source event into a format that is more efficiently processed by a cryptographic proof system than would be processed when in a source ledger format, the processing further comprising replacing non-circuit friendly cryptographic primitives with specified circuit friendly cryptographic primitives;

appending an output of the step of converting to the translation ledger;

accessing, by business logic, the appended output on the translation ledger, where the business logic is a zero-knowledge exchange; and generating, by the business logic, a zero-knowledge proof certifying accordance with a set of claimed business rules.

2. The method of claim 1, wherein the step of converting comprises one or more of reformatting and restructuring transaction data associated with the source event in a deterministic manner, then computing a block hash of the transaction data.

3. The method of claim 1, wherein correctness of an output of the step of converting is enforced by a consensus mechanism of the translation ledger.

4. A non-transitory machine-readable storage medium that provides instructions that, when executed by a processor, cause the processor to perform operations applied to a source ledger, the operations comprising:

tracking events in the source ledger by a translation ledger operated by a plurality of translation nodes, wherein the translation ledger is a distributed Byzantine fault-tolerant ledger;

processing, according to rules of the translation ledger, information within a source event in the source ledger to be appended to the translation ledger, the processing comprising converting at least a portion of information in the source event into a format that is more efficiently processed by a cryptographic proof system than would be processed when in a source ledger format, the processing further comprising replacing non-circuit friendly cryptographic primitives with specified circuit friendly cryptographic primitives;

appending an output of the step of converting to the translation ledger;

accessing, by business logic, the appended output on the translation ledger, where the business logic is a zero-knowledge exchange; and generating, by the business logic, a zero-knowledge proof certifying accordance with a set of claimed business rules, wherein the step of converting comprises one or more of reformatting and restructuring transaction data from a block associated with the source event in a deterministic manner, then computing a block hash of the transaction data, wherein correctness of an output of the step of converting is enforced by a consensus mechanism of the translation ledger.

5. An apparatus, comprising:

a processor; and a non-transitory machine-readable storage medium coupled with the processor that stores instructions that, when executed by the processor, cause the processor to perform at least the following operations applied to a source ledger:

tracking events in the source ledger by a translation ledger operated by a plurality of translation nodes, wherein the translation ledger is a distributed Byzantine fault-tolerant ledger;

processing, according to rules of the translation ledger, information within a source event in the source ledger to be appended to the translation ledger, the processing comprising converting at least a portion of information in the source event into a format that is more efficiently processed by a cryptographic proof system than would be processed when in a source ledger format, the processing further comprising replacing non-circuit friendly cryptographic primitives with specified circuit friendly cryptographic primitives;

appending an output of the step of converting to the translation ledger;

accessing, by business logic, the appended output on the translation ledger, where the business logic is a zero-knowledge exchange; and generating, by the business logic, a zero-knowledge proof certifying accordance with a set of claimed business rules, wherein the step of converting comprises one or more of reformatting and restructuring transaction data from a block associated with the new external source event in a deterministic manner, then computing a block hash of the transaction data, and wherein correctness of an output of the step of converting is enforced by a consensus mechanism of the translation ledger.

\* \* \* \* \*